April 19, 1949.  J. A. FOLSE  2,467,375

PRESSURE GAUGE

Filed April 5, 1945

Inventor
Julius A. Folse
By C. E. Herrstrom & W. E. Thibodeau
Attorneys

Patented Apr. 19, 1949

2,467,375

UNITED STATES PATENT OFFICE 2,467,375

PRESSURE GAUGE

Julius A. Folse, Miami, Fla.

Application April 5, 1945, Serial No. 586,814

9 Claims. (Cl. 73—419)

(Granted under the act of March 3, 1883, as amended April 30, 1928; 370 O. G. 757)

The invention described herein may be manufactured and used by or for the Government for governmental purposes without the payment to me of any royalty thereon.

This invention relates to a pressure gage of a simple mechanical construction for use in measuring pressures beyond the ranges of conventional Bourdon type gages.

Among the objects of the invention are to provide a gage which is simple, rugged and accurate, and which is capable of being easily attached to or detached from containers, the pressure in which is to be measured by the gage.

Further objects of the invention are to provide a gage which will not be materially affected by the rate of increase of pressure applied thereto; to provide a gage in which the inertia forces acting on the moving parts tend to be cancelled by oppositely disposing two identical gages; to provide a gage in which the force of friction between piston and cylinder is minimized by the use of labyrinth packing, and eliminating grease; and to provide a gage giving two readings, from which a knowledge of the accuracy of the pressure measurements may be obtained.

Other objects and advantages of the invention will hereinafter become more fully apparent from the following description of the drawing, which illustrates a preferred embodiment thereof, and wherein.

Figure 1:
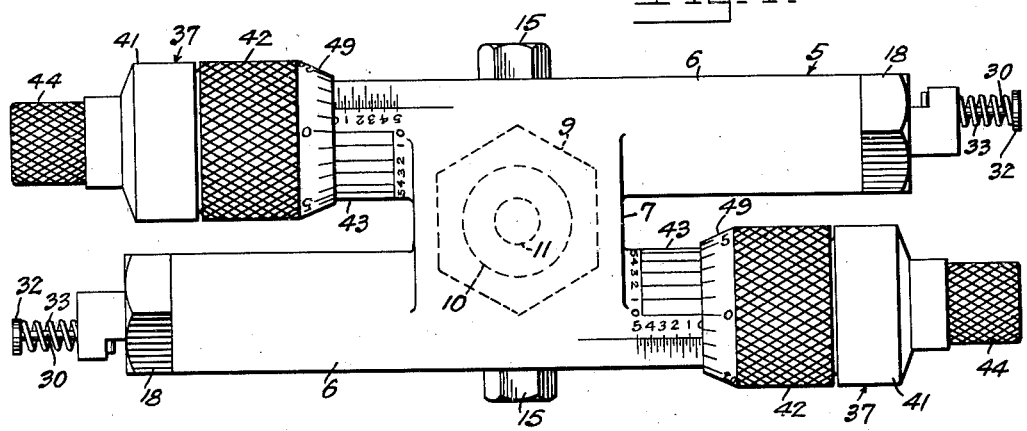
Figure 1 is a side elevational view of a gage constructed in accordance with the invention.

Referring more particularly to the drawing, wherein like reference characters designate like or corresponding parts throughout the several views, 5 designates generally the improved gage in its entirety and which includes two corresponding, substantially parallel disposed cylinders 6 which are spaced from one another at their ends and which are provided with an integral intermediate portion 7. Formed integral with and projecting laterally from the portion 7 is a fitting 8 having an enlarged portion 9, provided with wrench faces, and a restricted externally threaded nipple 10 therebeyond which is adapted to be threadedly engaged with an opening in a container or the like, in which the pressure is to be measured by the gage 5. The fitting 8 is provided with a longitudinally extending bore 11 which opens outwardly of the nipple 10, at one end thereof, and which communicates with the intermediate portion of a passage 12, at its opposite end. The passage 12 is formed in the integral portion 7 and is disposed perpendicular to the bore 11 and perpendicular to bores 13 of the cylinders 6. The passage 12 communicates with the bores 13, approximately intermediate of the ends of the cylinders 6, and extends therethrough and therebeyond and is provided with internally threaded outwardly opening ends 14, which open outwardly of the outer sides of the cylinders 6, and which ends are normally closed by threaded plugs 15.

Figure 2:
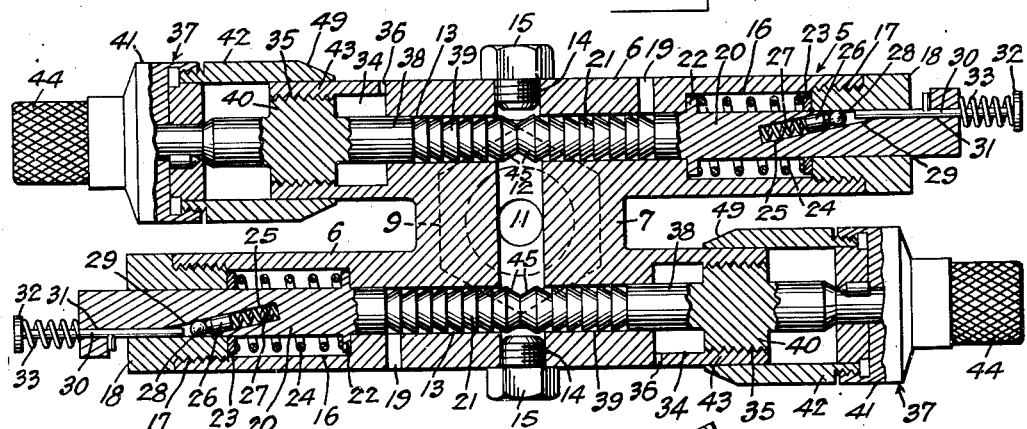
Figure 2 is a longitudinal, substantially central sectional view, partly in elevation, of the same.

The cylinders 6 are of identical construction and differ only in that they are in inverted positions relatively to each other, and the parts contained in the cylinders are identical, and therefore, the parts contained in only one of the cylinders 6 will be described. Said cylinder 6 is provided at one end thereof with an enlarged bore portion 16, into which one end of the bore 13 opens, and said bore portion 16 is provided with an outwardly opening internally threaded end 17 to receive a bushing 18. The bore 13, adjacent bore 16, is provided with a vent port 19. A piston 20 is reciprocally mounted in the bushing 18 and in the half of the bore 13, adjacent thereto, and the portion of the piston which engages the bore 13 is provided with a plurality of frustoconical portions 21 which taper toward the bushing 18 and which constitute, in effect, labyrinth packing. A collar 22 is suitably secured to or formed integral with the piston 20 and is disposed in the bore portion 16 and normally against the shoulder defining the inner end thereof. A collar or washer 23 slidably engages the piston 20 and is disposed in the bore portion 16 and against the inner end of the bushing 18, and forms an abutment for one end of a helical spring 24, which is carried by the piston 20, and which is disposed in the bore 16 and with its opposite end abutting against the collar 22 for urging the piston 20 inwardly of the cylinder 6 and to its innermost position, as seen in Figure 2.

The piston 20 is provided with a well 25 which is disposed obliquely to the axis thereof and which extends toward the outer end of the piston and which opens outwardly of the periphery thereof in the portion of the piston which is inclosed by bushing 18. A plunger 26 is slidably mounted in the well 25 and is spring biased outwardly thereof by an expansion spring 27 and bears against a spherical element 28 which is disposed in the open end of the well 25 and in engagement with the bore of the bushing 18. A wall portion 29 of the well 25 combines with the complementary portion of the bore of the bushing 18 to afford a wedge fit for the spherical member 28 by means of which said spherical member will be directed inwardly against the action of the spring backed plunger 26 when the piston 20 moves outwardly, relatively to the cylinder 6, to permit free outward movement of the piston 20; but which will be wedged between the wall portion 29 and the complementary portion of the bushing bore, when the piston is moved inwardly, to function as a friction ratchet to prevent inward movement of the piston until the sphere 28 is retracted into the well 25. A rod 30 is reciprocally mounted in a bore 31 of the piston 20 and has one end projecting from the outer end of the piston and which is provided with a head 32. A helical spring 33 is carried by the rod 30 and is disposed between the outer end of the piston 20 and the head 32 for urging the rod 30 outwardly of the piston 20 and to its inoperative position, as seen in Figure 2. The inner end of the rod 30 projects into the open mouth of the well 25 and is normally spaced from the sphere 28; but upon an inward pressure being exerted on the head 32, said inner end of the rod 30 is moved into engagement with the sphere 28 for retracting the sphere into the well 25 to thereby release it from frictional engagement with the bushing 18, to permit the piston 20 to be moved inwardly of the cylinder 6 by the action of the piston spring.

The opposite end of the bore 13 opens into an enlarged bore portion 34 which is provided with an internally threaded outer end 35 which opens outwardly of the opposite end of the cylinder 6. Bore portion 34, adjacent its inner end, is provided with a vent port 36. A micrometer caliper, designated generally 37, is mounted in the last mentioned end of the cylinder 6. The micrometer 37 is of conventional construction except that the yoke is dispensed with and the anvil is replaced by the inner end or head of the piston 20, as will hereinafter become apparent, and therefore, only so much of the micrometer 37 will be described as is essential to a full understanding of the invention. The micrometer 37 is provided with a stem or spindle 38 which is rotatably and reciprocally mounted in the opposite, last mentioned, end of the bore 13 in opposed relationship to the piston 20, and which is likewise made frusto-conical, as indicated at 39, in the same manner and for the same purpose as the piston 20. The stem 38 is provided with an enlargement 40, adjacent its outer end, which is threaded to form the micrometer screw and which is in threaded engagement with the threaded portion 35, which forms the fixed nut of the micrometer 37. A thimble cap 41 is connected to the outer end of the stem 38 and threadedly engages a thimble 42 which is disposed on and reciprocally and rotatably engaged with the last mentioned end 43 of the cylinder 6. Said end 43 forms the barrel of the micrometer 37. The micrometer 37 is also provided, at its outer end, with a ratchet stop 44 which functions in a conventional manner for making fine adjustments of the micrometer, and as seen in Figure 1, the thimble 42 and the ratchet stop 44 are provided with knurled surfaces.

The inner ends of the heads of the piston 20 and the stem 38 are formed frusto-conical and are tapered toward one another, as seen at 45, to form a space between the portions 45 and the cylinder, at the junction of the passage 12 with the bore 13, to admit the pressure medium to be measured to the space between the piston and the spindle.

Figure 3:
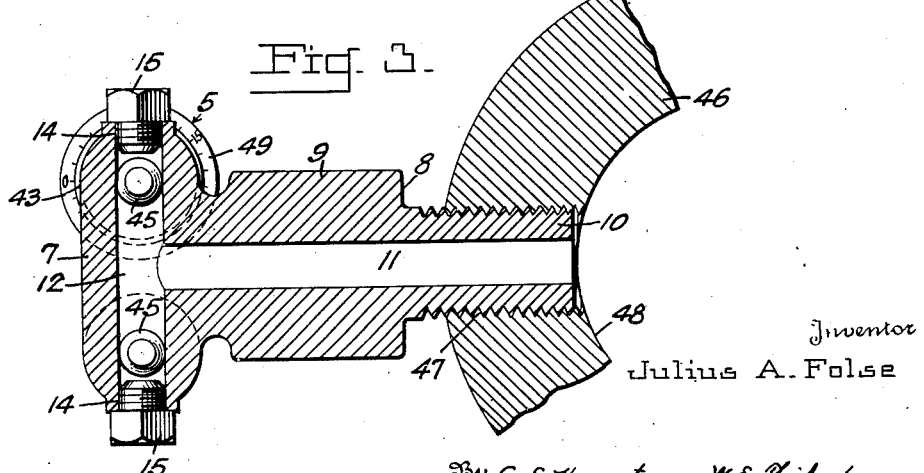
Figure 3 is a substantially central cross sectional view of the gage shown applied to a container, the pressure in which is to be measured.

In Figure 3 a portion of a weapon's barrel, designated generally 46, is illustrated, which is provided with a threaded port 47 which is disposed radially thereof and which has one end opening outwardly of the barrel 46 and its opposite end opening into the bore 48 of the barrel. The portion of the barrel 46, as illustrated, forms no part of the present invention but has been shown and described to illustrate one use of the gage 5 which is adapted, among other things, for measuring the pressure in the bore of a weapon's barrel.

In order to measure the pressure in the bore 48, immediately after a projectile, not shown, has been fired through the bore 48 and passes the port 47, the nipple 10 of the fitting 8 is screw threaded into the port 47. As a result, when the projectile is fired a part of the propelling gases therefrom will pass through the bore 11 into the passage 12 and through both ends of the passage 12 to the bores 13 of the two cylinders 6. The action of the propelling gases in the two cylinders 6 will be identical and, therefore, the action of the gases, in only one of the cylinders will be described. The gases entering said bore 13 will be admitted into the space in said bore formed by the frusto-conical faces 45, and as the stem or spindle 38 is held against movement in the bore 13 by the engagement of the threaded portions 35 and 40, the head of the stem 38 will act as a cylinder head for cylinder 6. Consequently, the pressure of the gases will force the piston 20 outwardly of the cylinder 6 and against the action of the piston spring 24. When the spring 24 has been compressed sufficiently to counterbalance the pressure exerted by the gases, the outward movement of the piston 20 will cease and when the pressure of the gases within the cylinder 6 is reduced by the projectile, not shown, clearing the muzzle of the barrel 46, for releasing the pressure therein, the spring 24 will tend to react to force the piston 20 inwardly of the cylinder 6. However, any inward movement of the piston will be prevented due to the fact that the sphere 28 will be wedged between the bore of the bushing 18 and the wall portion 29 to hold the piston in the outermost position which it has assumed.

As seen in Figure 1, the tapered inner end 49 of the thimble 42 and the barrel portion 43 are suitably inscribed with indicia including graduations, markings and a vernier for measuring to one-ten thousandths of an inch the movement of the stem 38 relatively to the cylinder 6. Consequently, by taking a reading of the micrometer 37 with the parts in their idle positions, as seen in Figure 2, prior to the time that the pressure medium is admitted to the gage 5, and by advancing the stem 38 by rotation of the thimble 42 and the ratchet stop 44 to move the head of the stem 38 into engagement with the head of the piston 20, after it has been projected outwardly of the cylinder 6 and while it is held in its outermost or projected position, and by thereafter taking another reading of the micrometer, the distance which the piston 20 has been moved by the force exerted by the pressure medium can be readily ascertained. Suitable means can be provided for converting this linear measurement into pounds per square inch. However, it is also contemplated that the indicia on the micrometer 37 can be designed to indicate pounds per square inch instead of distance.

It will be readily understood that by providing two cylinders 6 and by taking the measurement of the displacement of the pistons in each cylinder, a mean or average may be obtained which will be more accurate than the measurement obtained with a single cylinder.

The drawing illustrates the gage 5 on a scale which is substantially greater than the actual size of the gage, so that it will be readily apparent that the gage is capable of being conveniently handled or readily applied to or removed from any container the pressure in which is to be measured.

By retracting the pistons 20 and the spindles 38 a distance about equal to the diameter of the passage 12, and removing the plugs 15, a cleaning rod may be passed through the passage 12 for cleaning said passage and for removing any dirt or foreign matter which might have accumulated on the heads of the pistons and spindles and which might otherwise affect the accuracy of the measurements.

Various modifications and changes are contemplated and may obviously be resorted to, without departing from the spirit and scope of the invention as hereinafter defined by the appended claims, as only a preferred embodiment thereof has been disclosed.

I claim:

1. A pressure gage comprising a fitting for detachably engaging a container having a medium therein the pressure of which is to be measured, a cylinder connected intermediate of its ends to the fitting, said fitting having a bore communicating with the bore of the cylinder intermediate of the ends thereof, a piston slidably mounted in the cylinder having a head disposed normally adjacent the junction of said bores and a portion projecting from one end of the cylinder, spring means biasing the piston inwardly of the cylinder toward said fitting bore, a measuring device including a stem reciprocably mounted in the opposite end of the cylinder and forming a cylinder head, the heads of the piston and stem normally abutting and being recessed, at their abutting ends, to admit the medium under pressure, to be measured, to the cylinder at said recessed ends, said stem head forming a normally fixed cylinder head, and means cooperating with said cylinder and said piston for latching the piston to prevent return movement thereof after it has been forced outwardly relative to the cylinder by the medium to a projected position.

2. A pressure gage as in claim 1, said measuring device including a scale for measuring the distance of movement of the stem and means for advancing the stem toward and into engagement with the piston head for measuring the movement of the piston.

3. A pressure gage as in claim 1 including a plunger reciprocably mounted in the piston so as to be operable from the exterior of the gage, the interiorly disposed end of said plunger being arranged to engage and release the latching means in one reciprocal position of the plunger.

4. A pressure gage comprising a first cylinder having a pressure intake port intermediate of its ends, a second cylinder opening into the first cylinder, a piston reciprocally mounted in the second cylinder and spring biased toward said first cylinder, a third cylinder opening into said first cylinder and aligned with said second cylinder, a measuring device having a stem reciprocally mounted in the third cylinder in opposed relationship to the piston and forming a normally fixed cylinder head, said stem being movable relatively to the third cylinder to measure the displacement of the piston in response to a pressure exerted thereon, said measuring device including externally visible means for indicating the amount of movement of the stem.

5. A pressure gage as in claim 4, a spring biased latch for holding the piston against inward movement relatively to the cylinder and arranged to permit unrestricted outward movement of the piston.

6. A pressure gage as in claim 4, a spring biased latch for holding the piston against inward movement relatively to the cylinder and arranged to permit unrestricted outward movement of the piston, and an outwardly spring biased pushrod carried by the piston abutting said latch and adapted to be moved inwardly relatively to said piston for releasing the latch and thereby the piston for return movement.

7. A pressure gage as in claim 4, said piston and stem normally abutting at a point contiguous to said intake port, and said abutting portions being recessed to admit the pressure medium, to be measured, to the cylinder.

8. In a pressure gage comprising a cylinder having an intake port intermediate of its ends constructed and arranged to be connected to a source of a compressed medium to be measured, a piston reciprocally mounted in one end of the cylinder and having a head at the inner end thereof, spring means for biasing the piston inwardly of the cylinder, a friction one-way brake means carried by the piston and arranged to permit outward movement thereof but to prevent inward movement of the piston relatively to the cylinder, and a micrometer screw mounted on the opposite end of the cylinder and having a stem reciprocally disposed therein in opposed relationship to the piston and forming a normally fixed cylinder head.

9. In a pressure gage as in claim 8, said piston and stem normally abutting at the intake port of the cylinder and having recessed abutting ends to admit the compressed medium to be measured to the cylinder.

JULIUS A. FOLSE.

REFERENCES CITED

The following references are of record in the file of this patent:

UNITED STATES PATENTS

| Number | Name | Date |
| --- | --- | --- |
| 1,467,558 | Okill | Sept. 11, 1923 |
| 1,904,747 | Okill | Apr. 18, 1933 |

FOREIGN PATENTS

| Number | Country | Date |
| --- | --- | --- |
| 358,352 | France | Dec. 15, 1905 |
| 358,422 | France | Dec. 18, 1905 |